(12) United States Patent
Baek

(10) Patent No.: US 10,687,131 B2
(45) Date of Patent: Jun. 16, 2020

(54) SOUND OUTPUT DEVICE

(71) Applicant: LG ELECTRONICS INC., Seoul (KR)

(72) Inventor: Youngsang Baek, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/475,877

(22) PCT Filed: Jan. 3, 2018

(86) PCT No.: PCT/KR2018/000099
§ 371 (c)(1),
(2) Date: Jul. 3, 2019

(87) PCT Pub. No.: WO2018/128374
PCT Pub. Date: Jul. 12, 2018

(65) Prior Publication Data
US 2019/0349658 A1 Nov. 14, 2019

(30) Foreign Application Priority Data

Jan. 4, 2017 (KR) .................. 10-2017-0001516

(51) Int. Cl.
*H04R 1/02* (2006.01)
*H02N 15/00* (2006.01)
*H04R 9/06* (2006.01)

(52) U.S. Cl.
CPC ............. *H04R 1/025* (2013.01); *H02N 15/00* (2013.01); *H04R 9/06* (2013.01); *H04R 2420/07* (2013.01)

(58) Field of Classification Search
CPC .......... H04R 1/025; H04R 9/06; H04R 9/025; H04R 1/026; H04R 2420/07; H04R 2201/025; H04R 2201/028; H02N 15/00
See application file for complete search history.

(56) References Cited

U.S. PATENT DOCUMENTS

| 2006/0044094 A1* | 3/2006 | Davis ................... H02N 15/00 335/220 |
| 2011/0057754 A1* | 3/2011 | Kellum ................. H01F 7/0236 335/284 |
| 2013/0039527 A1* | 2/2013 | Jensen .................... H04R 1/24 381/387 |
| 2016/0150304 A1* | 5/2016 | Lee ......................... H02K 7/09 310/90.5 |
| 2016/0157002 A1* | 6/2016 | Chen ..................... H04R 1/025 381/332 |

FOREIGN PATENT DOCUMENTS

| JP | 2016-111696 A | 6/2016 |
| KR | 10-0873737 B1 | 12/2008 |
| KR | 10-1135396 B1 | 4/2012 |
| KR | 10-1523269 B1 | 5/2015 |

* cited by examiner

*Primary Examiner* — Yogeshkumar Patel
(74) *Attorney, Agent, or Firm* — Birch, Stewart, Kolasch & Birch, LLP

(57) ABSTRACT

Disclosed is a sound output device including: an elevation member having a magnetic force generating part that generates a magnetic field to cause a flying body to levitate; a transmission member moving the elevation member in an upward-downward direction while rotating along a circumference of the elevation member; and a support member rotatably supporting the transmission member.

22 Claims, 13 Drawing Sheets

SOUND OUTPUT DEVICE

CROSS REFERENCE TO RELATED APPLICATIONS

This application is the National Phase of PCT International Application No. PCT/KR2018/000099, filed on Jan. 3, 2018, which claims priority under 35 U.S.C. 119(a) to Patent Application No. 10-2017-0001516, filed in the Republic of Korea on Jan. 4, 2017, all of which are hereby expressly incorporated by reference into the present application.

BACKGROUND OF THE INVENTION

1. Field of the Invention

The present invention relates to a sound output device having a speaker capable of levitating.

2. Description of the Related Art

A speaker is required to vibrate by itself in order to vibrate air. In a case where the speaker is in contact with an external object (a floor, a wall, etc.), the external object may disturb the vibration and cause noise, thereby affecting sound quality. There is a conventional technology of causing a speaker to levitate so that the speaker can vibrate without contact with any external object. In order to cause the speaker to levitate, a magnetic force (repulsive force) caused by a magnetic fields is used. In addition, a speaker having an electromagnet for changing a magnetic field in order to locate a speaker at a predetermined position in the air is already known.

SUMMARY OF THE INVENTION

The problem of the conventional technologies is that it is difficult to control a height of a levitating speaker. A first objective of the present invention is to address this problem.

A second objective of the present invention is to minimize a vertical length of a device in order to control a height of a levitating speaker.

A third objective of the present invention is to provide structural stability when it comes to controlling a height of a levitating speaker.

A fourth objective of the present invention is to provide a structure, in which a specific height level of a levitating speaker can be easily preset and a current height can be maintained without causing load to motor even when a height control device is stopped.

A fifth objective is to reduce a driving load on a motor.

In order to achieve the above objectives, there is provided a sound output device including: an elevation member having a magnetic force generating part that generates a magnetic field to cause a flying body to levitate; a transmission member moving the elevation member in an upward-downward direction while rotating along a circumference of the elevation member; and a support member rotatably supporting the transmission member.

In order to achieve the objectives, there is provided a sound output device including: a flying body having a speaker and a magnetic body; a magnetic force generating part generating a magnetic force in relation with the magnetic body; a frame to which the magnetic force generating part is fixed; a guide connector projected from the frame; a transmission member having a driving guide into which the guide connector is inserted; and a driving part rotating the transmission member in a circumferential direction.

The elevation member may include: a frame supporting the magnetic force generating part; and a guide connector supporting the frame. The transmission member may movably support the guide connector.

The magnetic force generating part may be disposed in a central portion of the frame, as viewed from above. The transmission member extends along a circumference of the frame.

The elevation member may include a plurality of guide connectors spaced apart from each other along a circumferential direction.

The transmission member may surround the circumference of the elevation member in a circumferential direction, and the support member may surround a circumference of the transmission member in the circumferential direction.

The transmission member may include: a side wall part extending along the circumference of the elevation member; and a driving guide formed along an inner side surface of the side wall part. The elevation member comprises a guide connector, of which movement is guided as the guide connector is in contact with the driving guide.

The driving guide may form a groove recessed in the inner side surface of the side wall part or a hole penetrating the inner side surface of the side wall part. The guide connector is inserted into the driving guide.

The transmission member may rotate in a first direction when the elevation member moves upward, and the transmission member may rotate in a second direction when the elevation member moves downward.

The transmission member may include a plurality of driving guides spaced apart from each other at predetermined intervals along a circumferential direction, and the elevation member may include a plurality of guide connectors disposed at positions respectively corresponding to the plurality of driving guides.

The driving guide may include an inclined portion upwardly inclined along a first direction. To achieve the fifth objective, inclination of the inclined portion forms an acute angle, as viewed from a side.

The driving guide may include a horizontal portion connected to one end of the inclined portion and horizontally extending.

The driving guide may include: an inclined portion upwardly inclined along a first direction; a first horizontal portion connected to one end of the inclined portion and horizontally extending; and a second horizontal portion connected to the other end of the inclined portion and horizontally extending.

The driving guide may include: a horizontal portion horizontally extending along a first direction; a first inclined portion connected to an end of a side of the horizontal portion in a second direction and downwardly inclined along the second direction; and a second inclined portion connected to an end of a side of the horizontal portion in a first direction and upwardly inclined along the first direction.

The driving guide may include: a first horizontal portion horizontally extending along a first direction; a first inclined portion connected to an end of a side of the first horizontal portion in the first direction and upwardly inclined along the first direction; a second horizontal portion connected to an end of a side of the first inclined portion in the first direction and horizontally extending along the first direction; a second inclined portion connected to an end of a side of the second horizontal portion in the first direction and upwardly inclined along the first direction; and a third horizontal portion connected to an end of a side of the second inclined portion in the first direction and horizontally extending along the first direction.

The support member may include a transmission member guide guiding rotation of the transmission member in a circumferential direction. The transmission member guide may include: a lower guide extending along a lower end of the transmission member; and an upper guide extending along an upper end of the transmission member.

The elevation member may include a frame supporting the magnetic force generating part. To achieve the third objective, one of the support member and the frame may include an elevation member guide extending in an upward-downward direction, and the other thereof may include a guide receiving part into which the elevation member guide is inserted to guide movement of the elevation member in the upward-downward direction.

The transmission member may include a gear part forming gear teeth along a circumferential direction. The sound output device further may include: a motor generating a rotational force for rotating the transmission member; and a driving transmission part rotating by receiving the rotational force of the motor, and forming gear teeth to be engaged with gear teeth of the gear part.

The driving transmission part may be disposed in the support member and disposed close to a direction opposite to a centrifugal direction of the transmission member.

There is an advantageous effect in that a height of a levitating speaker can be controlled conveniently.

In addition, as a vertical width of a device for controlling a levitation height of a speaker is reduced, there is an advantageous effect in that a height of the whole device can be reduced.

In addition, there is an advantageous effect in that a fore of gravity, a magnetic fore (repulsive force), and a force downwardly acting on the elevation member can be stably distributed using arrangement relationship between the transmission member and the elevation member or structures of a plurality of driving guides and guide connectors. In particular, in a state in which the flying body is levitating, a non-uniform magnetic force (repulsive force) may acting on the elevation member while the elevation member moves, and thus, there is an advantageous effect in that the structure proposed in the present invention allows the elevation member to be stably supported and move without inclination.

In addition, as inclination of the inclined portion forms an acute angle, there is an advantageous effect in that a force of rotating the transmission member in the circumferential direction is reduced when the elevation member is raised. In doing so, a load on the motor can be reduced. Specifically, at a portion where the guide connector and the inclined portion comes into contact, a force of pushing the guide connector upward is greater than a force of pushing the guide connector by the driving guide in the horizontal direction (circumferential direction), and, although the transmission member is rotated in the circumferential direction with a relatively weak force, the elevation member can be pushed upward with a relatively strong force.

In addition, as the driving guide includes the horizontal portion, there is an advantageous effect in that the transmission member can remain in a stopped state without a load applied to the motor. In particular, a force of gravity and a magnetic force acting on the elevation member are all transmitted to the transmission member, and, even in this case, a load is not applied substantially to the motor in a state in which the guide connector is in contact with the horizontal portion.

In addition, as horizontal portions are provided on both sides of the inclined portions, it is easy to preset two positions where the elevation member is stopped at different heights.

In addition, as the horizontal portion is provided between two inclined portions, it is easy to preset a specific position in the middle of the entire movement range of the elevation member.

In addition, as the first horizontal portion, the first inclined portion, the second horizontal portion, the second inclined portion, and the third horizontal portion are provided, it is easy to preset a plurality of positions (the lowest position, the highest position, a middle position, etc.) where the elevation member is stopped at different heights.

BRIEF DESCRIPTION OF THE DRAWINGS

FIG. 1A shows a flying body 20 levitating at a relatively low height.

FIGS. 2A and 2B are perspective view of an interior of a case 11 of a lower body 10 of FIGS. 1A and 1B. FIG. 2A shows an elevation member 100 located at a first position h1, which is relatively low, and FIG. 2B shows the elevation member 100 located at a second height h2 which is relatively high.

FIG. 8A is a view showing a state in which a height of the elevation member 100 is a minimum value 10, FIG. 8B is a view showing a state in which a height of the elevation member 100 is a specific value 11 greater than the minimum value 10 and smaller than a maximum value 12, and FIG. 8C is a view showing a state in which a height of the elevation member 100 is the maximum value 12 greater than the specific value 11.

DETAILED DESCRIPTION OF THE PREFERRED EMBODIMENTS

Figure 1A:
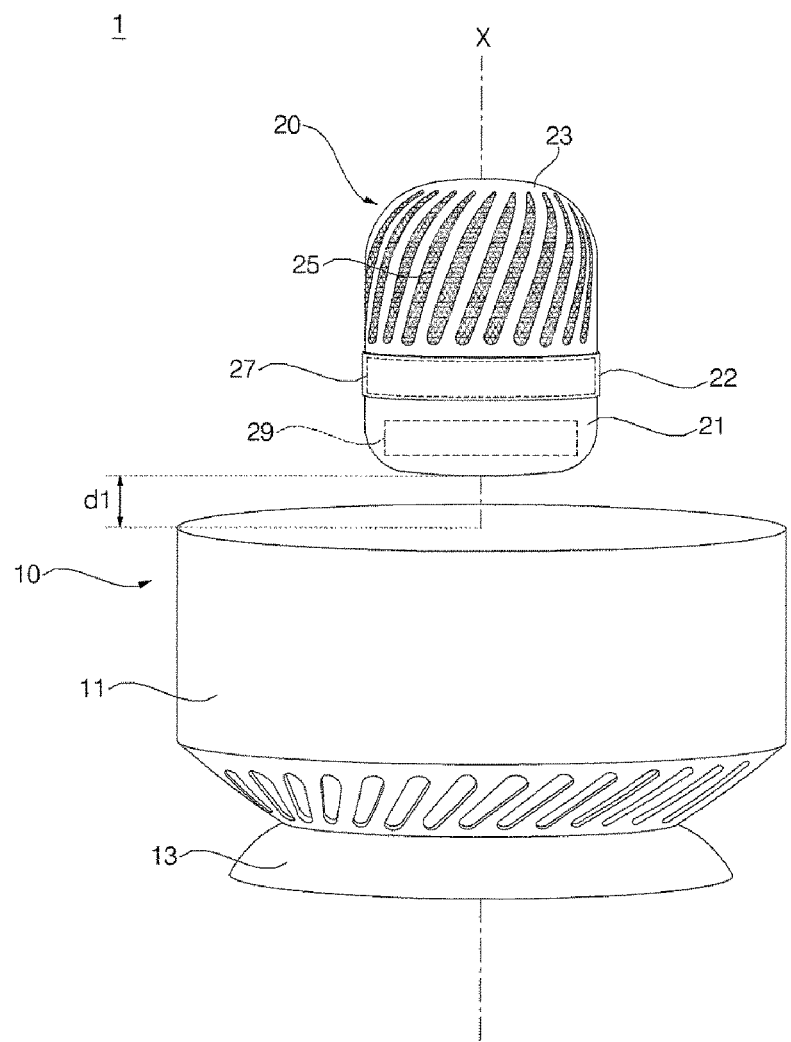
FIGS. 1A and 1B are perspective views of a sound output device 1 according to an embodiment of the present invention.
Figure 1B:
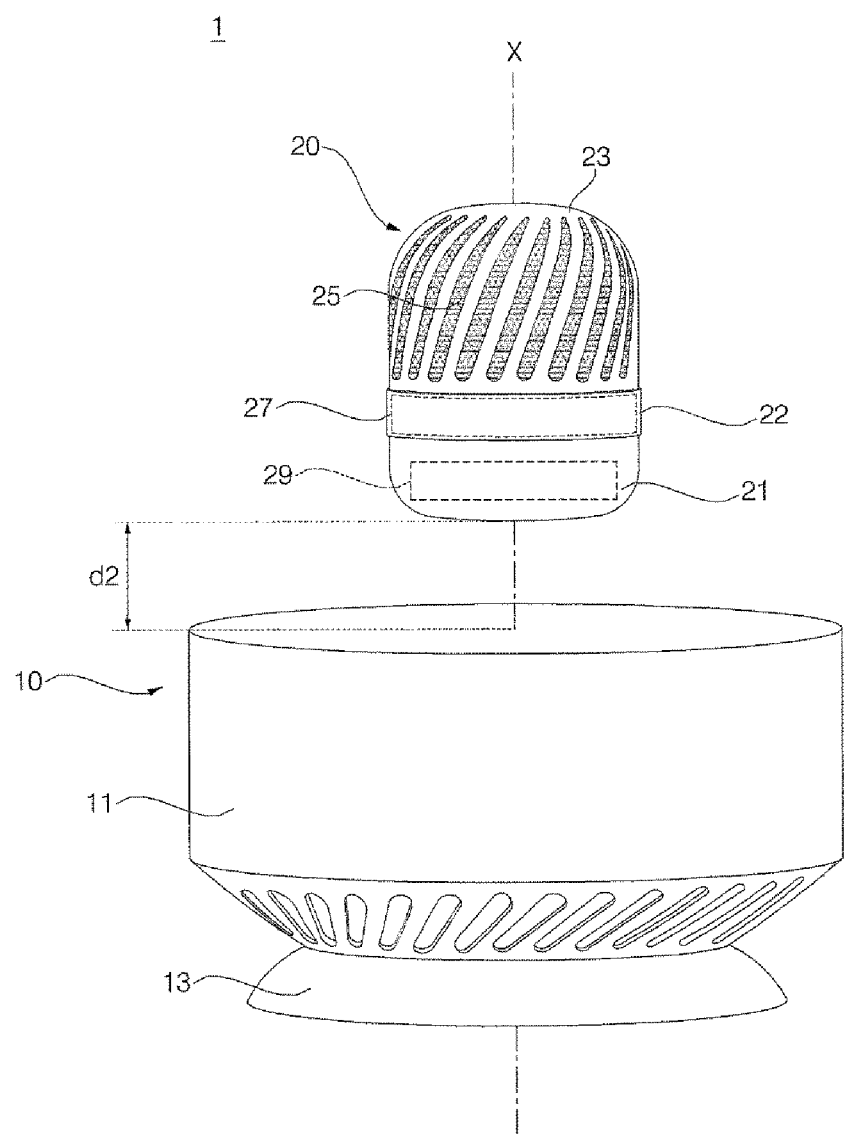
Figure 2A:
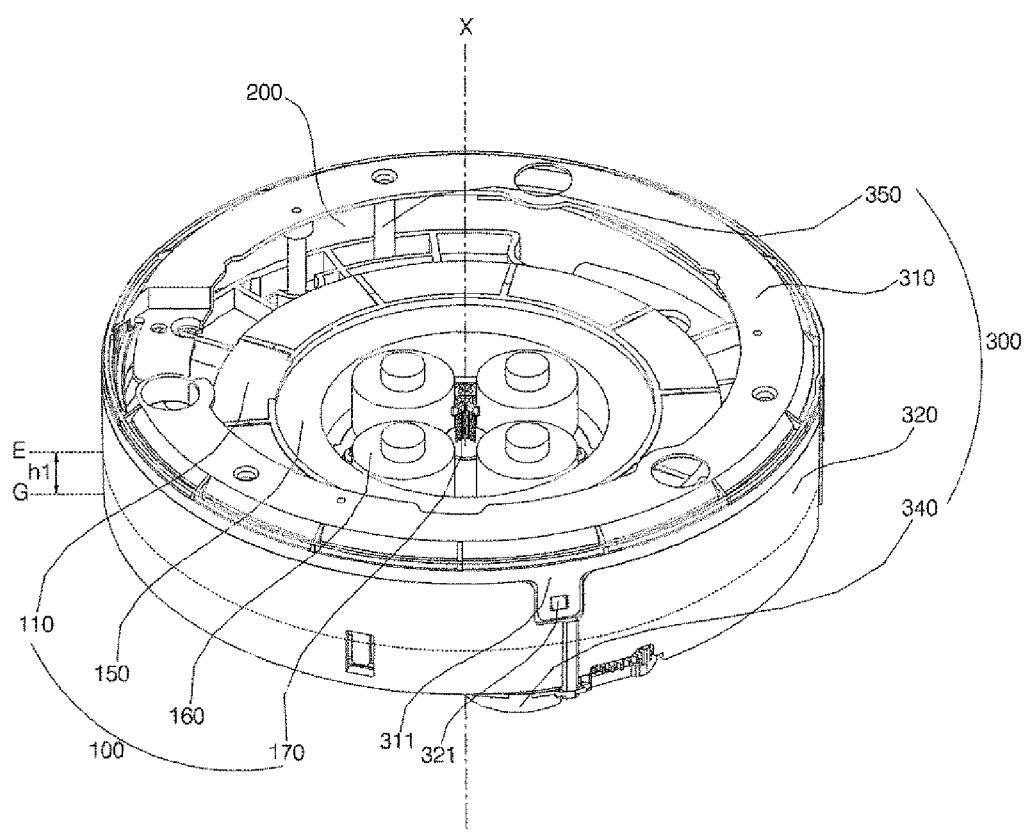
Figure 2B:
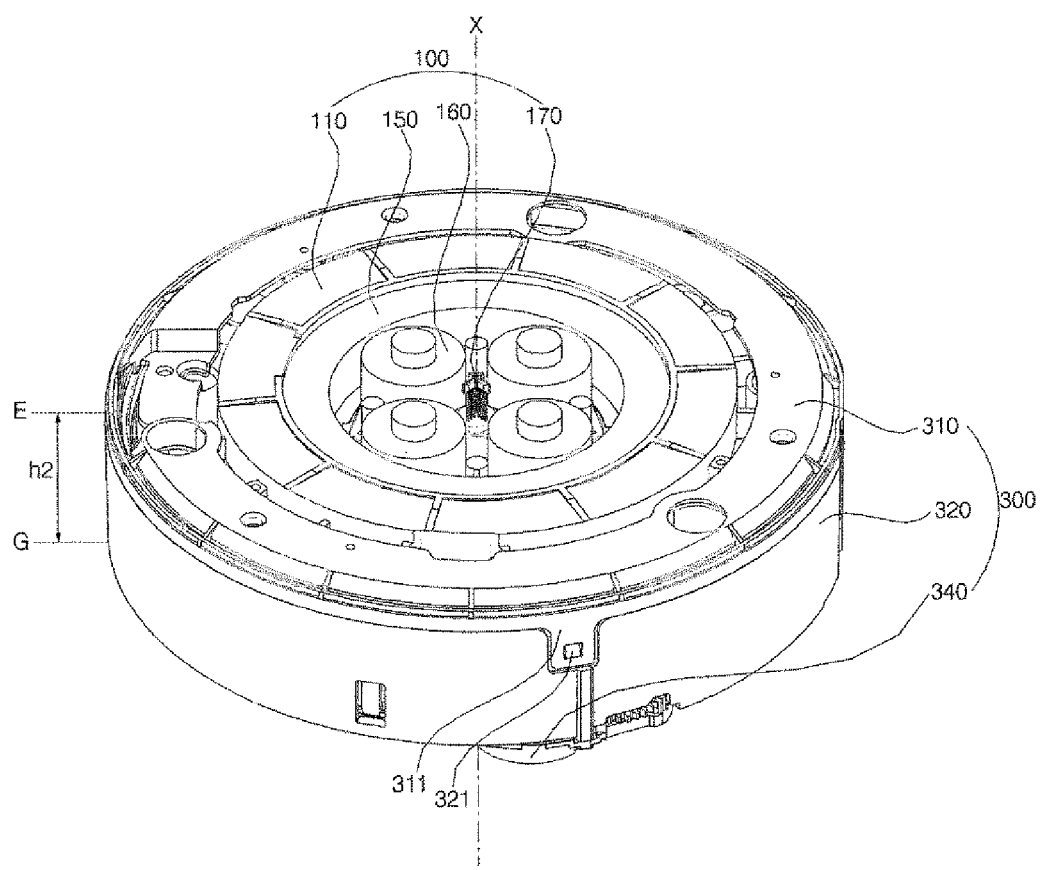
FIG. 2B shows the flying body 20 levitating at a relatively high height.

Hereinafter, the direction of gravity is referred to as a downward direction, and an upper direction is defined in relation with the downward direction. In addition, the term "central axis X" used herein refers to a virtual axis that vertically passes through the center of a sound output device 1 as shown in FIGS. 1A, 2A, and 2B. Hereinafter, a direction away from the central axis X is defined as a "centrifugal direction", a direction closer to central axis X is defined as a "a direction opposite to the centrifugal direction", and a direction of rotation about the central axis X is defined as a circumferential direction. In addition, as viewed from above, the circumferential direction is composed of a clockwise direction and a counter-clockwise direction, and one of the clockwise direction and the counter-clockwise direction is defined as a "first direction" and the other thereof is defined as a "second direction". These terms are, however, used merely to provide a better understanding of the present invention, and it is apparent that the directions can be defined differently by different references.

It will be understood that although the terms "first," "second," etc., may be used herein to describe various components, these components should not be limited by these terms. These terms are only used to distinguish one component from another component.

Referring to FIGS. 1A to 2B, a sound output device 1 according to an embodiment of the present invention includes a lower body 10 for generating a magnetic force. The sound output device 1 include a flying body 20 capable of levitating using a repulsive force caused by the magnetic force The lower body 10 is disposed below the flying body 20. The lower body 10 include a case 11 forming an exterior appearance. The case 11 may be formed in a cylindrical shape. As viewed from above, the case 11 may be in a circular shape. The case 11 forms an interior space. The case 11 accommodates an elevation member 100, a transmission member 200, and a support member 300. The lower body 10 includes a base 13 supporting the case 11. The base 13 may be disposed below the case 11 and placed on an external floor.

The flying body 20 includes a speaker 25 for outputting sound. The flying body 20 includes an input unit 27 that is, for example, a button or touch screen for receiving a user's instruction. The flying body 20 includes a magnetic body 29 that is subject to an electromagnetic force in interaction with a magnetic force generating unit 150 of the lower body 10.

The magnetic body 29 may be disposed in a lower portion of the flying body 20. The magnetic body 29 may be disposed inside the lower portion 21. A speaker 25 may be disposed in an upper portion 23 of the flying body 20. The speaker 25 is provided to output sound in all directions about the central axis. The input unit 27 may be disposed in a middle portion 22 interposed between the lower portion 21 and the upper portion 23 of the flying body 20. The flying body 20 may include a battery (not shown) for operating the speaker. In addition, the sound output device 1 may include a wireless charging module (not shown) for wirelessly charging the battery.

The lower body 10 includes the elevation member 100 capable of moving in an upward-downward direction. The lower body 10 includes the transmission member 200 that delivers a force to the elevation member 100 in the upward-downward direction. The lower body 10 includes the support member 300 that supports the transmission member 200.

The elevation member 100 includes the magnetic force generating unit 150 that generates an electromagnetic field for causing the flying body 20 to levitate. The magnetic force generating unit 150 generates an electromagnetic force in relation with the magnetic body 29. The magnetic force generating unit 150 may be an electromagnet, yet, in the present embodiment, the magnetic force generating unit 150 is a ring-type permanent magnet. One of an upper surface and a lower surface of the magnetic force generating unit 150 has S polarity and the other has N polarity. Hereinafter, a description of the present embodiment is provided in the assumption that the upper surface of the magnetic force generating unit 150 is an N-pole surface.

Some of lines of magnetic force generated by the magnetic force generating part 150 may start from the N pole (the upper surface of the magnetic force generating part), be bent in a direction opposite to the centrifugal direction, vertically pass through the sound output device 1 on the central axis X, and then return back to the S pole (the lower surface of the magnetic force generating part). The rest of the lines of magnetic force generated by the magnetic force generating unit 150 may start from the N pole (the upper surface of the magnetic generating unit), be bent in the centrifugal direction, and then return to the S pole (the lower surface of the magnetic force generating part). In this case, the upper portion on the central axis X is the S pole, and the lower portion on the central axis X is the N pole. In order to levitate on the central axis X, the flying body 20 is provided such that the lower surface of the magnetic body 29 is the S pole and the upper surface thereof is the N pole. That is, the lower surface of the magnetic body 29 of the flying body 20 and the upper surface of the ring-type magnetic force generating part 150 of the lower body 10 have opposite polarities.

The closer the flying body 20 is positioned on the central axis X toward the magnetic force generating part 150, the greater the magnetic force (repulsive force) becomes. The flying body 20 levitates at a position where the force of gravity acting on the flaying body 20 in a downward direction and the magnetic force (repulsive force) acting on the flaying body 20 in an upward direction are in balance. That is, a state in which the force of gravity and the magnetic force, acting on the flying body 20, are in balance to cause the flying body 20 to levitate is defined as a "balanced state".

Since the flying body 20 in the balanced state remains at a constant position relative to the magnetic force generating part 150, if a height of the magnetic force generating part 150 is changed in the upward-downward direction, a levitation height of the flying body 20 may be changed in the upward-downward direction.

The elevation member 100 includes a frame 110 to which the magnetic force generating part 150 is fixed. The frame 110 supports the magnetic force generating part 150. The frame 110 may be formed in a circular shape, as viewed from above. The magnetic force generating part 150 is disposed in a central portion of the frame 110, as viewed from above. The magnetic force generating part 150 is disposed above the frame 110.

The elevation member 100 includes a hall sensor 170 disposed on the central axis X. The hall sensor 170 senses a magnetic flux. In a case where there is only a magnetic flux occurring by the magnetic force generating part 150, the magnetic flux sensed by the hall sensor 170 is defined as a "reference magnetic flux value". The "reference magnetic flux value" does not change even by the magnetic body 29 of the flaying body 20 remaining in the balanced state. If the flying body 20 deviates from the central axis X (if the balanced state becomes unstable suddenly), a magnetic flux value sensed by the hall sensor 170 may become different from the reference magnetic flux value due to the magnetic flux of the magnetic body 29.

The elevation member 100 include a magnetic force control part 160 to prevent the flying body 20 from deviating from the central axis X. The magnetic force control part 160 may be an electro magnet formed of coils. A plurality of magnetic force control parts 160 is disposed about the central axis X at predetermined intervals in the circumferential direction. In the present embodiment, four magnetic control parts 160a, 160b, 160c, and 160d are spaced apart from each other at predetermined intervals in the circumferential direction. Once a current is applied to a magnetic force control part 160, one of an upper surface and a lower surface of the magnetic force control part 160 becomes the N pole and the other there of becomes the S pole, thereby generating an additional magnetic flux using which the flying body 20 can be induced to be placed on the central axis X.

For example, if the flying body 20 in the balanced state slightly moves to deviate from the central axis X in one direction, the hall sensor 170 senses a change in magnetic flux caused by the movement of the flying body 20 and thereby a current is applied to the magnetic force control part 160a disposed in one direction. If the upper surface of the magnetic force control part 160a with the current applied serves as the S pole, the upper surface of the magnetic force control part 160a may push the flying body 20 toward the central axis X.

The elevation member 100 includes a guide connector 120 that moves along a driving guide 240. The guide connector 120 is fixed to the frame 110. The guide connector 120 is supported by the transmission member 200. The guide connector 120 supports the frame 110. The elevation member 100 includes a plurality of guide connectors 120a, 120b, and 120c spaced apart from each other along the circumferential direction. The plurality of guide connectors 120a, 120b, and 120c are spaced apart from each other at predetermined intervals along a circumferential direction of the frame 110.

The transmission member 200 is rotatable along a circumferential direction of the elevation member 100. The transmission member 200 rotates along a circumference of the elevation member 100. While rotating, the transmission member 200 moves the elevation member 100 in a vertical direction. If the elevation member 100 moves upward by the transmission member 200, a height of the magnetic force generating part 150 is increased. If the height of the magnetic force generating part 150 is increased, a height of the flaying body 20 to be rendered in the balanced state is increased.

In FIGS. 2A and 2B, a dotted line indicated by G shows a reference position in the upward-downward direction, and a dotted line indicated by E shows a position of the magnetic force generating part 150 in the upward-downward direction. A height of the magnetic force generating part 150 is defined a height h1 or h2 relative to the reference position. The reference position G is defined as a position lower than the lowest position to which the magnetic force generating part 150 can be moved, and the present description is merely exemplary.

The state shown in FIG. 2A is a state in which the elevation member 100 is placed at a relatively low position by the transmission member 200. In this case, the height of the magnetic force generating part 150 is a first height h1 that is relatively low. In this case, a distance between the lower surface of the flying body 20 and the upper surface of the lower body 10 is a first distance d1 that is relatively short (see FIG. 1A).

Although not illustrated in the drawing, if the elevation member 100 is lowered enough to thereby cause the magnetic force generating part 150 to be positioned at a sufficiently low height, a position where the flying body 20 is in the balanced state becomes lower than the upper surface of the case 11 of the lower body 10, and hence, the upper surface of the lower body 10 may come into contact with the lower surface of the flying body 20.

The state shown in FIG. 2B is a state in which the elevation member 100 is at a relatively high position by the transmission member 200. In this case, a height of the magnetic force generating part 150 is a second height h2 that is relatively high. The second height h2 is higher than the first height h1. In this case, a distance between the lower surface of the flying body 20 and the upper surface of the lower body 10 is a second distance d2 that is relatively long (see FIG. 1B). The second distance d2 is longer than the first distance d1.

The support member 300 rotatably supports the transmission member 200.

The support member 300 includes a side surface cover 320 that surrounds a circumference of the transmission member 200. The side surface cover 320 extends along the circumferential direction. The side surface cover 320 is generally formed in a cylindrical shape. The side surface cover 320 forms an interior space 320a. In the interior space 320a, the transmission member 200 and the elevation member 100 are disposed. The side surface cover 320 includes a top cover connector 321 fixed to a top cover 310.

The support member 300 includes the top cover 310 that is disposed above the side surface cover 320. The top cover 310 is disposed above the elevation member 100. The top cover 310 forms a central hole 310a at a central portion. As viewed from above, the magnetic force generating part 150 is disposed inside the central hole 310a. The top cover 310 includes a top cover connector 311 that is fixed to the top cover connector 321 of the side surface cover 320.

The support member 300 includes a lower surface cover 330 disposed below the side surface cover 320. The lower surface cover 330 is disposed below the elevation member 100. The lower surface cover 330 is fixed to a lower end of the side surface cover 320. The lower surface cover 330 may be formed integrally with the side surface cover 320.

The support member 300 includes a driving part 340 that rotates the transmission member 200. The driving part 340 rotates the transmission member 200 in the circumferential direction. The driving part 340 is disposed below the elevation member 100. The driving part 340 may be fixed to the lower surface cover 330. The driving part 340 is disposed in a direction opposite to the centrifugal direction of the transmission member 200.

The support member 300 includes a transmission member guide 350 that guides a moving direction of the transmission member 200. The transmission member guide 350 guides rotation of the transmission member 200 in the circumferential direction.

The support member 300 includes an elevation member guide 360 that guides a moving direction of the elevation member 100. The elevation member guide 360 guides upward or downward movement of the elevation member 100.

Referring to FIGS. 3 to 9, the elevation member 100, the transmission member 200, and the support member 300 of the present invention are described in more detail.

The side surface cover 320 and the lower surface cover 330 are integrally formed to form the interior space 320a that is opened at the upper side thereof. The transmission member 200 is disposed in the centrifugal direction of the side surface cover 320. The elevation member 100 is disposed in the centrifugal direction of the transmission member 200. The top cover 310 is disposed above the transmission member 200 and the elevation member 100.

The frame 110 is formed a circumference along the circumferential direction. A circumferential surface of the frame 110 faces a side surface of the transmission member 200 in the centrifugal direction. As viewed from above, a side wall part 230 is disposed within the side surface cover 320 and the frame 110 is disposed within the side wall part 230.

The guide connector 120 is guided in contact with the driving guide 240 to move. The guide connector 120 is allowed to move only in the upward-downward direction, and the driving guide 240 is allowed to move only in the circumferential direction. If the driving guide 240 moves in the circumferential surface, the guide connector 120 moves in the upward-downward direction according to inclination of the driving guide 240.

The guide connector 120 protrudes in the centrifugal direction. The guide connector 120 protrudes from the frame 110 in the centrifugal direction. The guide connector 120 may pass through the side wall part 230. The guide connector 120 is inserted into the driving guide 240. The guide connector 120 is allowed to move relatively with respect to the driving guide 240 while inserted into the driving guide 240.

A plurality of guide connectors 120a, 120b, and 120c may be provided at positions respectively corresponding to a plurality of driving guides 240a, 240b, and 240c. The plurality of guide connectors 120a, 120b, and 120c may be spaced apart from each other at predetermined intervals along the circumferential direction. In doing so, there is an advantageous effect of stably distributing the force of gravity, the magnetic force (repulsive force), and a force downwardly acting on the elevation member 100 by the force of gravity.

The guide connector 120 includes a projected shaft 121 fixed to the frame. The guide connector 120 includes a roller 123 rotatable about the center of the projected shaft 121. The projected shaft 121 is projected from the frame 110 in the centrifugal direction. The roller 123 directly contacts the driving guide 240. If the driving guide 240 moves in the circumferential direction, the roller 123 receives only a force in the upward-downward direction while rotating in contact with the driving guide 240.

The transmission member 200 movably supports the guide connector 120. The transmission member 200 extends along a circumference of the frame 110. The transmission member 200 may surround the circumference of the elevation member 100 in the circumferential direction.

If the elevation member 100 moves upward, the transmission member 200 rotates in the first direction, and, if the elevation member 100 moves downward, the transmission member 200 rotates downward. Of course, in a state where the guide connector 120 is in contact with a horizontal portion 243 described later on, the elevation member 100 stops with remaining at a height even when the transmission member 200 rotates in the first direction or the second direction.

The side wall part 230 extends along a circumference of the elevation member 100. The side wall part 230 extends the circumference of the frame 110. The side wall part 230 is formed in a pipe shape, which forms a height in the upward-downward direction and forms a thickness in the centrifugal direction.

The driving guide 240 is formed along an inner side surface of the side wall part 230. The driving guide 240 may form a groove that is recessed from the side wall part 230 in the centrifugal direction in the inner side surface. The driving guide 240 may form a hole penetrating the inner side surface of the side wall part 230 in the centrifugal direction. The guide connector 120 is inserted into the driving guide 240. The guide connector 120 is inserted into the groove or hole of the driving guide 240, and guided to move in the upward-downward direction in accordance with movement of the driving guide 240 in the circumferential direction.

The driving guide 240 extends in the circumferential direction. The meaning of "extending in the circumferential direction" includes extending while upwardly extending in the circumferential direction, and extending while downwardly inclined in the circumferential direction.

A plurality of driving guides 240a, 240b, and 240c spaced apart from each other at predetermined intervals along the circumferential direction may be provided. The plurality of 240a, 240b, and 240c rotatably supports the plurality of guide connectors 120a, 120b, and 120c, respectively.

Referring to FIGS. 8A to 8E, configuration and operation of the driving guide 240 and the guide connector 120 are described below.

The driving guide 240 includes an inclined portion 241 upwardly inclined along the first direction. If the transmission member 200 moves in the first direction with the guide connector 120 brought into contact with the inclined portion 241, the guide connector 120 moves downward and the elevation member 100 moves downward. If the transmission member 200 moves in the second direction with the guide connector 120 brought into contact with the inclined portion 241, the guide connector 120 moves upward and the elevation member 100 moves upward. Inclination of the inclined portion forms an acute angle, as viewed from side.

The driving guide 240 includes a horizontal portion 243 connected to one end of the inclined portion 241 and horizontally extending in the first direction. Even when the transmission member 200 rotates in the first direction or the second direction with the guide connector 120 brought into contact with the horizontal portion 243, the elevation member 100 stops with remaining at a height.

In addition, when the guide connector 120 is bought into contact with the horizontal portion 243 while the driving guide 240 is stopped, a weight of the elevation member 100 (a sum of gravity and an electromagnetic force) is transferred to the horizontal portion 243. At this point, since a movable direction of the transmission member 200 and a direction of load applied to the transmission member 200 are vertical to each other, there is an advantageous effect of remaining the transmission member 200 stopped without a load being applied to a motor 241.

The inclined portion 241 and the horizontal part 243 may be connected and arranged alternately. The horizontal portion 243 and a plurality of inclined portions 241 may be connected and arranged alternately. The inclined portion 241 and a plurality of horizontal portion 243 may be connected and arranged alternately.

The driving guide 240 may include an inclined portion 241 upwardly inclined along the first direction, a first horizontal portion 243a connected to an end of a side of the inclined portion 241 in the second direction and horizontally extending along the second direction, and a second horizontal portion 243b connected to an end of a side of the inclined portion 241 in the first direction and horizontally extending along the first direction. As the horizontal portion 243 is placed on both sides of the inclined portion 241, it is easy to preset two positions at which the elevation member 100 is to be stopped at different heights.

The driving guide 240 includes a horizontal portion 243 horizontally extending in the first direction, a first inclined portion 241a connected to an end of a side of the horizontal portion 243 in the second direction and downwardly inclined along the second direction, and a second inclined portion 241b connected to an end of a side of the horizontal portion 243 in the first direction and upwardly inclined along the first direction. As the horizontal part 243 is placed between two inclined portions 241, it is easy to preset a specific position in the middle of an upward and downward movement range of the elevation member 100.

The driving guide 240 includes a first horizontal portion 243a horizontally extending in the first direction. The driving guide 240 includes a first inclined portion 241a connected to an end of a side of the first horizontal portion 243a in the first direction and upwardly inclined along the first direction. The driving guide 240 includes a second horizontal portion connected to an end of a side of the first inclined portion 241a in the first direction and horizontally extending along the first direction. The driving guide 240 includes a second inclined portion 241b connected to an end of a side of the second horizontal part 243 in the first direction and upwardly inclined along the first direction. The driving guide 240 includes a third horizontal portion 243c connected to an end of a side of the second inclined portion 241b in the first direction and horizontally extending along the first direction. Hence, it is easy to preset a plurality of positions (the lowest position, the highest position, and the middle position) where which the elevation member 100 is to be stopped at different heights.

Figure 8A:
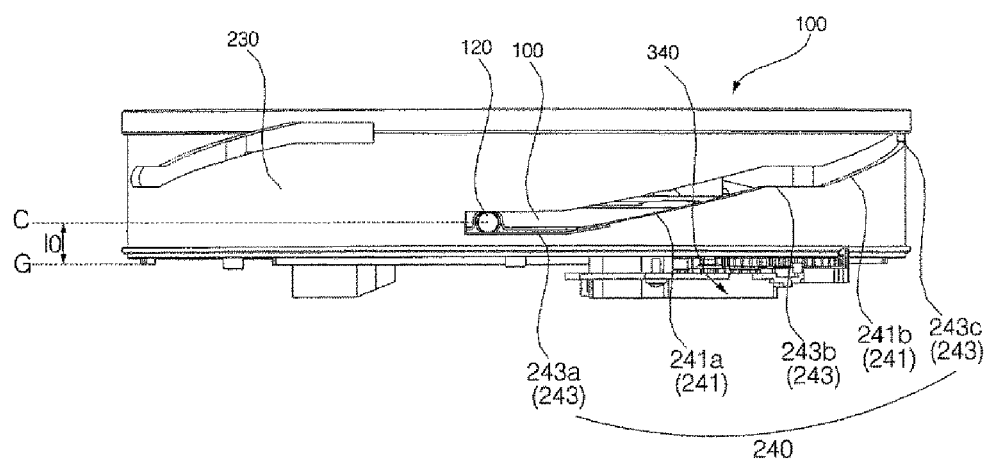
FIGS. 8A, 8B, and 8C are elevation views of the lower body 10 of FIG. 7, as seen from a side surface.
Figure 8B:
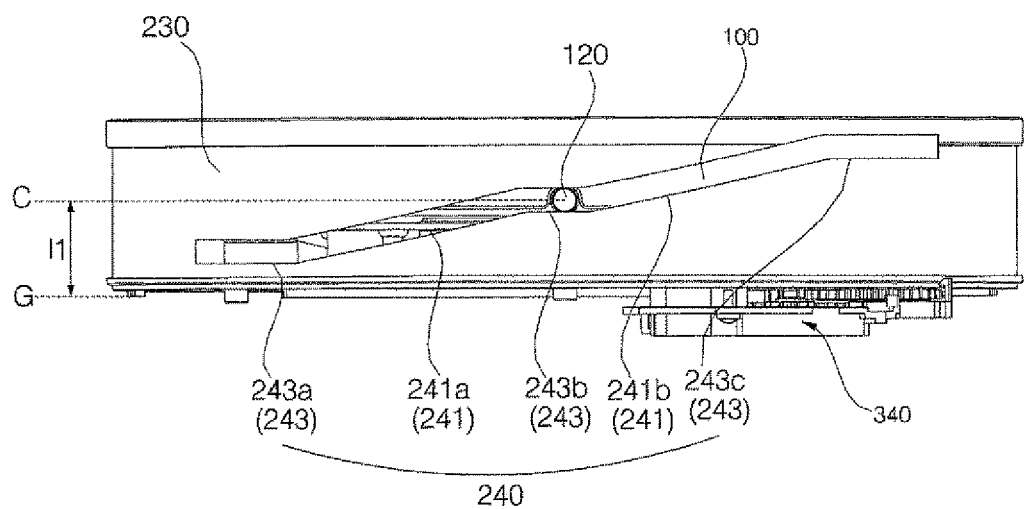
Figure 8C:
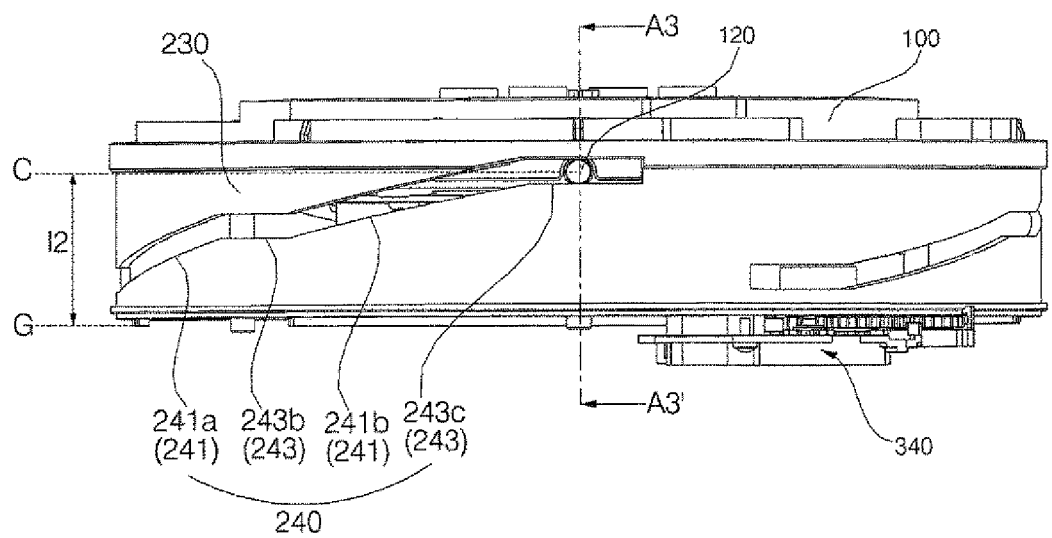
Figure 9:
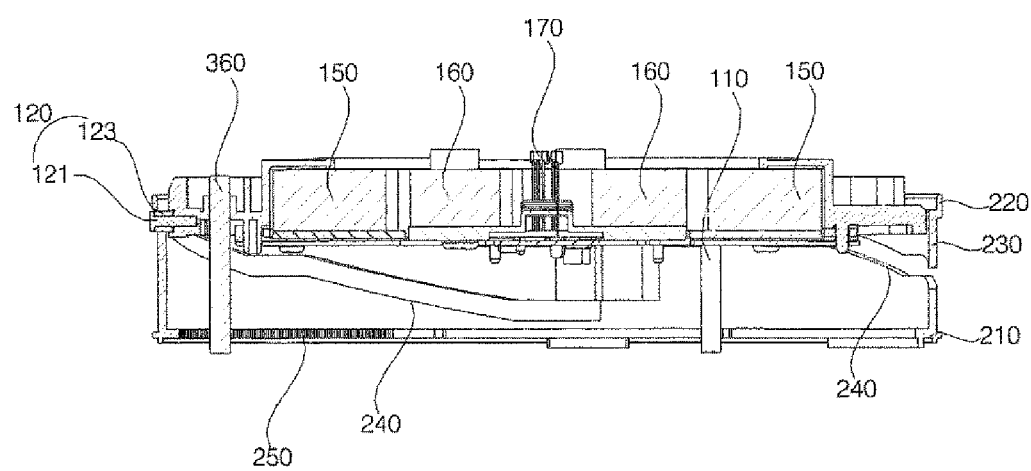
FIG. 9 is a cross-sectional view of the lower body 10 of FIG. 8C vertically taken along line A3-A3'.

Referring to FIGS. 8A, 8B, and 8C, a dotted line indicated by G shows a reference position in the upward-downward direction, and a dotted line indicated by C shows a position of the guide connector 120 in the upward-downward direction. A height of the guide connector 120 is defined as a height 10, 11, or 12 relative to the reference position. The reference position G is defined as a position lower than the lowest position to which the magnetic force generating part 150 can be moved, and the present description is merely exemplary.

FIG. 8A shows a state in which the elevation member 100 is at the lowest position. In this case, a height of the guide connector 120 is the lowest value lo. In this case, the guide connector 120 is brought into contact with the first horizontal portion 243a. In this case, a distance between the lower surface of the flying body 20 and the upper surface of the lower body 10 is a minimum value, and the minimum value of the distance may be set to a value greater than 0 or may be set to 0 (if the distance between the lower surface of the flying body 20 and the upper surface of the lower body 10 is 0, the lower surface and the flying body 20 and the upper surface of the lower body 10 are in contact with each other.

FIG. 8B shows a state in which the elevation member 100 is at a position higher than the lowest position. If the driving guide 240 rotates in the first direction with the guide connector 120 brought into contact with the first horizontal portion 243a (see FIG. 8A), the guide connector 120 may move vertically upward along the first inclined portion 241a to be thereby brought into contact with the second horizontal part 243b (See FIG. 8B). In this case, a height of the guide connector 120 is a specific value 11 greater than the lowest value lo. In this case, a distance between the lower surface of the flying body 20 and the upper surface of the lower body 10 is maintained to a predetermined value.

FIG. 8C shows a state in which the elevation member 100 is at the highest position. If the driving guide 240 rotates in the first direction with the guide connector 120 brought into contact with the second horizontal portion 243b (see FIG. 8B), the guide connector 120 may move vertically upward along the second inclined portion 241 to be thereby brought into contact with the third horizontal portion 243c (See FIG. 8C). In this case, a height of the guide connector 120 is a maximum value 12 greater than the specific value 11. In this case, a distance between the lower surface of the flying body 20 and the upper surface of the lower body 10 is a maximum value.

Meanwhile, if the driving guide 240 rotates in the second direction with the guide connector 120 brought into contact with the third horizontal portion 243c (see FIG. 8C), the guide connector 120 may move vertically downward along the second inclined portion 241b to be thereby brought into contact with the second horizontal portion 243b (see FIG. 8B). If the driving guide 240 rotates in the second direction with the guide connector 120 brought into contact with the second horizontal portion 243b (see FIG. 8B), the guide connector 120 may move vertically downward along the first inclined portion 241a to be thereby brought into contact with the first horizontal portion 243a (see FIG. 8A).

Figure 5:
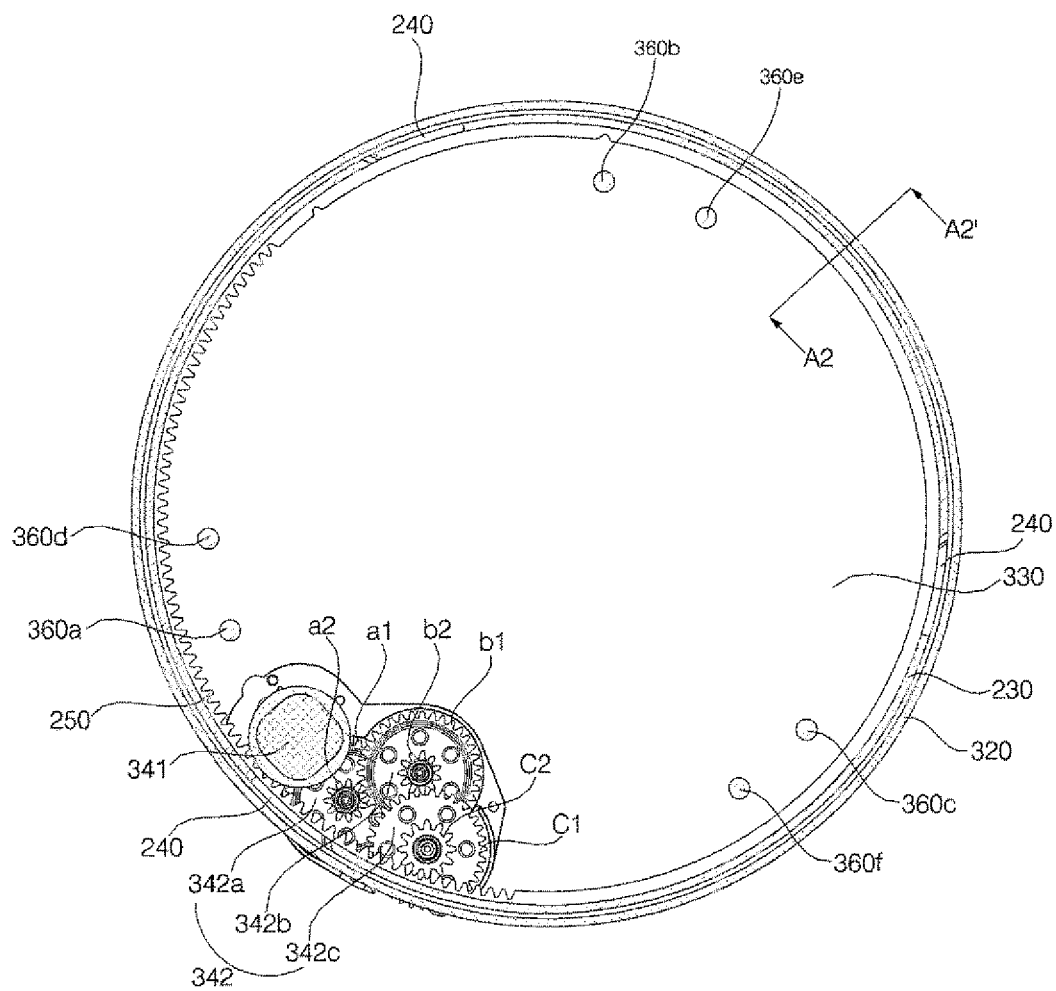
FIG. 5 is a cross-sectional view of the lower body horizontally taken along line A1-A1'.

Referring to FIG. 5, the transmission member 200 includes a gear part 250 that forms gear teeth along the circumferential direction. The gear part 250 is disposed below the side wall part 230. The transmission member 200 is provided such that a rotation range thereof is restricted. The gear part 250 may be provided only within an angle range in which the transmission member 200 is capable of rotating.

The support member 300 surrounds the circumference of the transmission member 200 in the circumferential direction. The support member 300 surrounds the circumference of the side wall part 230. Hence, rigidity of the side wall part 230 may be reinforced.

The driving part 340 provides power for rotating the transmission member 200. The driving part 340 includes the motor 341 that generates a rotational force for rotating the transmission member 200. The motor 341 may be located below the elevation member 100. The motor 341 is disposed in the support member 300. The motor 341 is disposed close to the centrifugal direction of the transmission member 200. The motor 341 is supported by the support member 300.

A driving transmission part 342 transmits the rotational force of the motor 341 to the transmission member 200. The driving transmission part 342 rotates by receiving the rotational force of the motor 341. The driving transmission part 243 forms gear teeth to be engaged with the gear teeth of the gear part 250. The driving transmission part 342 is disposed in the support member 300. The driving transmission part 342 is disposed close to the centrifugal direction of the transmission member 200. The driving transmission part 342 is supported by the support member 300.

The driving transmission part 342 may include a gear 342c that forms gear teeth to be engaged with the gear teeth of the gear part 250. The driving transmission part 342 may include a plurality of gears 342a, 342b, and 342c. The driving transmission part 342 includes a first gear 342a that is rotated in engagement with a gear (not shown) a gear that is rotated while fixed to a rotational shaft of the motor 341. The first gear 342a may form a gear teeth a1 formed along a circumference of a circle having a relatively great diameter about a concentric axis, and gear teeth a2 formed along a circumference of a circle having a relative small diameter about the concentric axis. The gear teeth a1 is engaged with the gear, which is fixed to the rotational shaft of the motor 341 and rotated, and the gear teeth a2 is engaged with the second gear 342b. The driving transmission part 342 includes the second gear 342b that is rotated in engagement with the first gear 342a. The second gear 342b may form gear teeth b1 formed along a circumference of a circle having a relatively greater diameter about a concentric axis, and gear teeth b2 formed along a circumference of a circle having a relatively smaller diameter about the concentric axis. The gear teeth b1 is engaged with the first gear 342a, and the gear teeth b2 is engaged with a third gear 342c. The driving transmission part 342 includes the third gear 342c that is rotated in engaged with the second gear 342b. The third gear 342c may form gear teeth c1 formed along a circumference of a circle having a relatively greater diameter about a concentric axis, and gear teeth c2 formed along a circumference of a circle having a relatively smaller diameter about the concentric axis. The gear teeth c1 is engaged with the second gear 342b, and the gear teeth c2 is engaged with the gear part 250. Using such configuration of the driving transmission part 342, the transmission member 200 may be moved at a speed decelerated lower than a speed of rotation of the motor 341.

Figure 6:
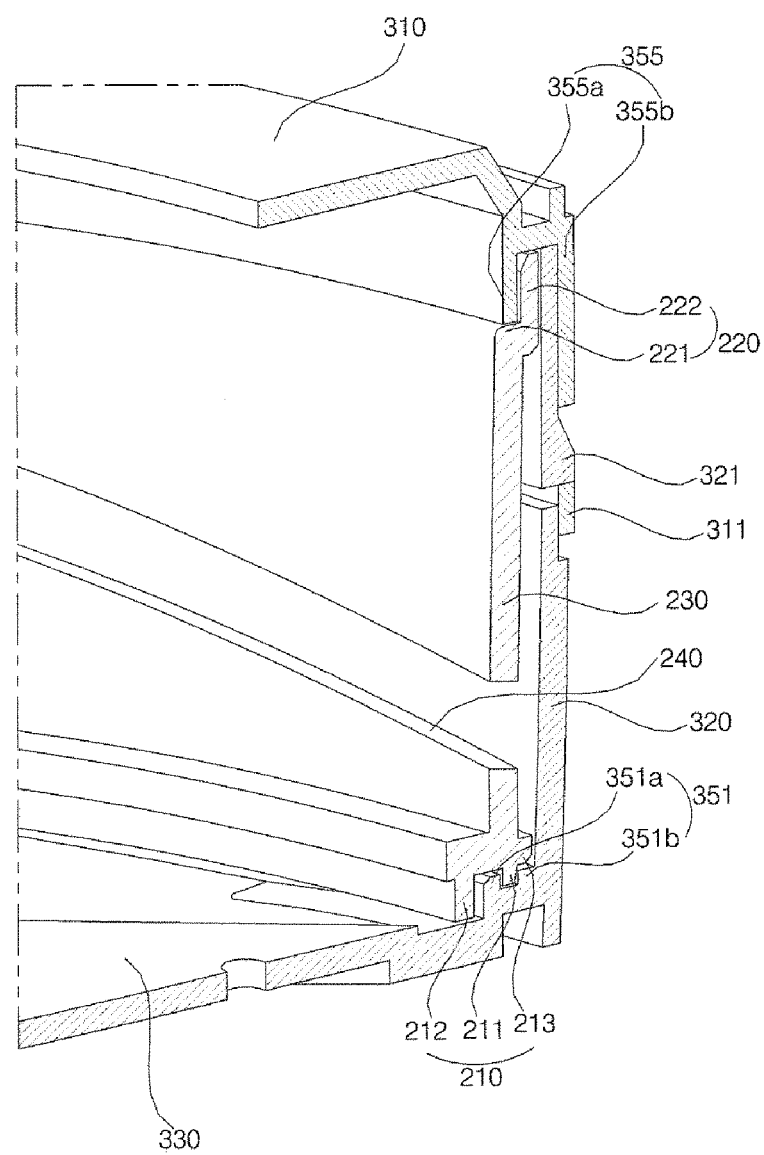
FIG. 6 is a cross-sectional perspective view of the lower body 10 vertically taken along line A2-A2'.

Referring to FIG. 6, the transmission member guide 350 includes a lower guide 351 extending along a lower end of the transmission member 200. The lower guide 251 is formed along the circumferential direction. The lower guide 351 forms a groove recessed from an upper side toward a lower side, and a lower end portion of the side wall part 230 is inserted into the groove of the lower guide 251. The groove of the lower guide 351 extends along the circumferential direction, and a first lower projected portion 211 of a lower slider 210 is inserted into the groove of the lower guide 351 to slide. The lower guide 351 includes two lower parts 351a and 351b between which the groove of the lower guide 351 is formed. The two lower parts 351a and 351b are projected upward from the lower surface cover 330. The two lower parts 351a and 351b is formed to extend in the circumferential direction. The two lower parts 351a and 351b forms a concentric circle, as viewed from above. A first lower part 351a is disposed closer to a centrifugal direction than a second lower part 351b is.

The transmission member guide 350 includes an upper guide 355 extending along an upper end of the transmission member 200. The upper guide 355 is formed along the circumferential direction. The upper guide 355 forms a groove recessed from an upper side toward a lower side, and an upper end of the side wall part 230 is inserted into the groove of the upper guide 355. The groove of the upper guide 355 extends along the circumferential direction, and an upper projected portion 222 of an upper slider 220 is Inserted into the groove of the upper guide 355 to slide. The upper guide 355 includes two upper parts 355a and 355b between which the groove of the upper guide 355 is formed. The two upper parts 355a and 355b are projected downward from the top cover 310. The two upper parts 355a and 355b is formed to extend in the circumferential direction. The two upper parts 355a and 355b may form a concentric circle, as viewed from below. A first upper part 355a is disposed closer to a centrifugal direction than a second upper part 355b is. The upper portion of the side wall part 230 and the upper portion of the side surface cover 320 are inserted together into the groove of the upper guide 355. The upper end of the side wall part 230 is inserted between a side surface of the upper portion of the side surface cover 320 in a centrifugal direction and a side surface of the first upper part 355a in a direction opposite to the centrifugal direction to slide.

A lower slider 210 is disposed below the side wall part 230. The lower slider 210 includes lower projected portions 211 and 212 projected downward. The lower projected portions 211 and 212 extend along the circumferential direction. The lower slider 210 includes a first lower projected portion 211 that is inserted between the two lower parts 351a and 351b to slide. The lower slider 210 includes a lower projected portion 212 that slides while in contact with a side surface of the first lower part 351a in the centrifugal direction. The first lower part 351a is inserted between the two lower projected portions 211 and 212 to slide. The lower slider 210 includes a separation maintaining part 213 projected from the side wall part 230 in the centrifugal direction. The separation maintaining part 213 may be formed in a lower portion of the side wall part 230. An end of a side of the separation maintaining part 213 in the centrifugal direction may slide while in contact with an inner side surface of the side surface cover 320.

The upper slider 220 includes a stopper 221 that forms a surface bent in the upper portion of the side wall part 230 in the centrifugal direction to face the upper side. The stopper 221 extends in the circumferential direction. A lower end of the first upper part 355a comes into contact with and is stopped by the upper surface of the stopper 221. The upper slider 220 includes an upper projected portion 222 upwardly projected from an end of a side of the stopper 221 in the centrifugal direction. The upper projected portion 222 extends in the circumferential direction.

As the stopper 221 and the separation maintaining part 213 are provided, a portion where the driving guide 240 is formed at a predetermined distance from the inner side surface of the side surface cover 320, and operation of the driving guide 240 and the guide connector 120 may be not interrupted by the side surface cover 320 even though the guide collector 120 is disposed with passing through the hole of the driving guide 240.

Figure 3:
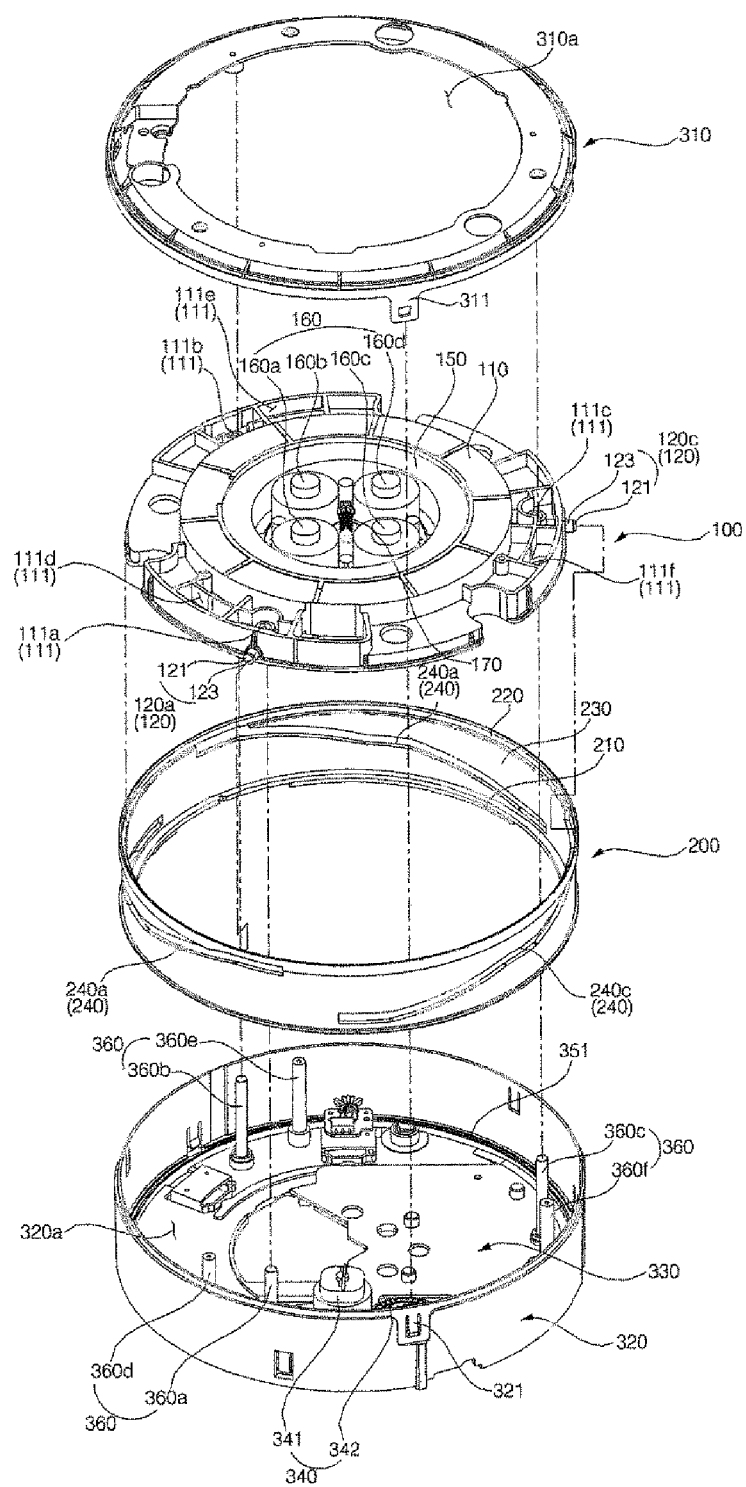
FIG. 3 is an exploded perspective view of the second lower body 10 of FIGS. 2A and 2B.
Figure 4:
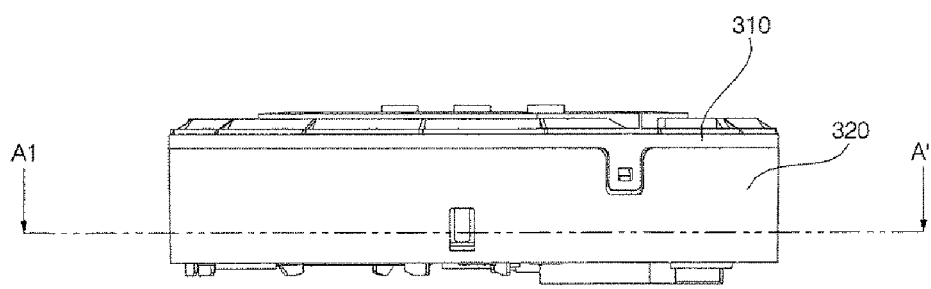
FIG. 4 is an elevation view of a side surface of the lower body 10 of FIG. 2B.
Figure 7:
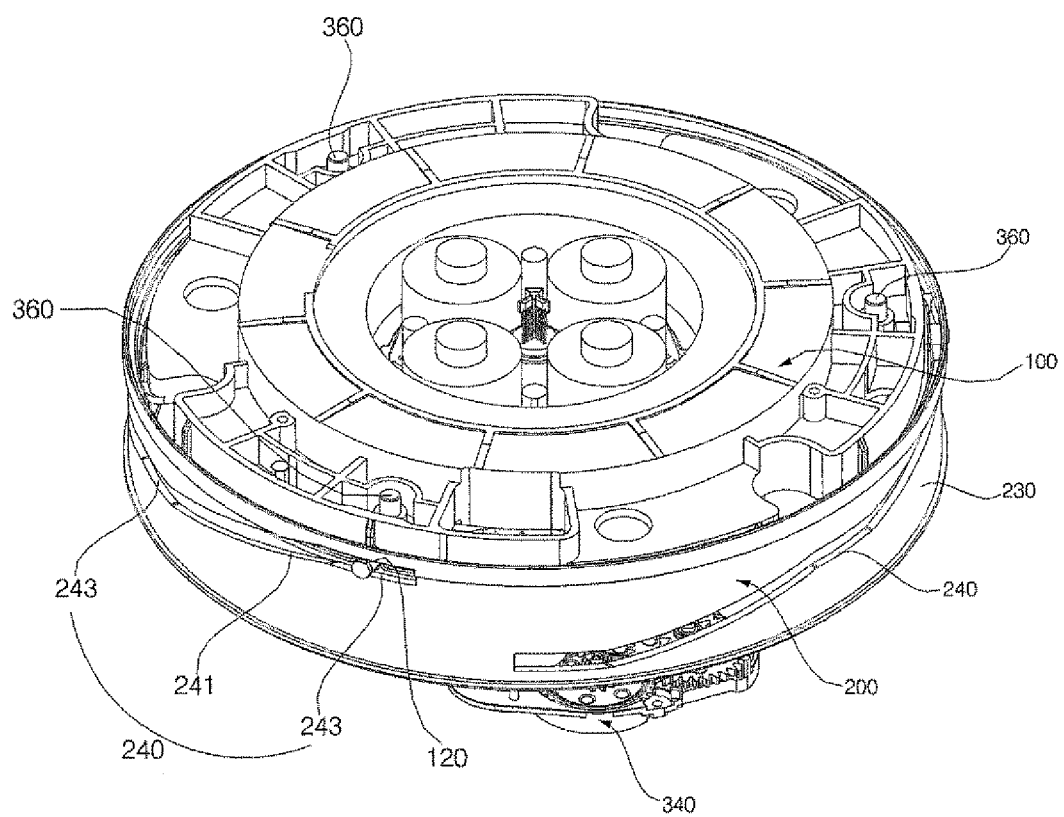
FIG. 7 is a perspective view the lower body 10 of FIG. 2A, from which a top cover 310, a side surface cover 320, and a bottom cover 330 are removed.

Referring to FIGS. 3, 7, and 8, one of the support member 300 and the frame 110 includes an elevation member guide 360 extending in the upward-downward direction, and the other thereof includes a guide receiving part 111 into which the elevation member guide 360 is inserted to thereby guide movement of the elevation member 100 in the upward-downward direction.

In the present embodiment, the elevation member guide 360 is disposed in the support member 300, and the guide receiving part 111 is formed in the frame 110.

A lower end of the elevation member guide 360 is fixed to the bottom cover 330. The elevation member guide 360 may be formed to be upwardly projected from the bottom cover 330. An upper end of the elevation member guide 360 may be formed to be a free end. The elevation member guide 360 is vertically formed in a straight line. The elevation member guide 360 may be formed in a pin shape. The elevation member guide 360 may be provided in plural. A plurality of elevation member guides 360a, 360b, 360c, 360d, 360e, and 360f are spaced apart from each other along the circumferential direction.

The guide receiving part 111 is formed at a position corresponding to the elevation member guide 360. The guide receiving part 111 may be an opening that vertically penetrates the frame 110. The elevation member guide 360 is inserted into the guide receiving part 111, thereby restricting the elevation member 100 to move only in the upward-downward direction. The guide receiving part 111 may be provided in plural. A plurality of guide receiving parts 111a, 111b, 111c, 111d, 111e, and 111f are spaced apart from each other along the circumferential direction. The plurality of guide receiving parts 111a, 111b, 111c, 111d, 111e, and 111f is formed at positions respectively corresponding to the elevation member guides 360a, 360b, 360c, 360d, 360e, and 360f.

What is claimed is:

1. A sound output device comprising:
an elevation member having a magnetic force generating part that generates a magnetic field to cause a flying body to levitate;
a transmission member moving the elevation member in an upward-downward direction while rotating along a circumference of the elevation member; and
a support member rotatably supporting the transmission member.

2. The sound output device of claim 1,
wherein the elevation member comprises:
a frame supporting the magnetic force generating part; and
a guide connector supporting the frame, and
wherein the transmission member movably supports the guide connector.

3. The sound output device of claim 2,
wherein the magnetic force generating part is disposed in a central portion of the frame, as viewed from above, and
wherein the transmission member extends along a circumference of the frame.

4. The sound output device of claim 2, wherein the elevation member comprises a plurality of guide connectors spaced apart from each other along a circumferential direction.

5. The sound output device of claim 1,
wherein the transmission member surrounds the circumference of the elevation member in a circumferential direction, and
wherein the support member surrounds a circumference of the transmission member in the circumferential direction.

6. The sound output unit of claim 1,
wherein the transmission member comprises:
a side wall part extending along the circumference of the elevation member; and
a driving guide formed along an inner side surface of the side wall part, and
wherein the elevation member comprises a guide connector, of which movement is guided as the guide connector is in contact with the driving guide.

7. The sound output device of claim 6,
wherein the driving guide forms a groove recessed in the inner side surface of the side wall part or a hole penetrating the inner side surface of the side wall part, and
wherein the guide connector is inserted into the driving guide.

8. The sound output device of claim 1, wherein the transmission member rotates in a first direction when the elevation member moves upward, and the transmission member rotates in a second direction when the elevation member moves downward.

9. The sound output device of claim 1,
wherein the transmission member comprises a driving guide extending in a circumferential direction, and
wherein the elevation member comprises a guide connector, of which movement is guided as the guide connector is in contact with the driving guide.

10. The sound output device of claim 9,
wherein the transmission member comprises a plurality of driving guides spaced apart from each other at predetermined intervals along a circumferential direction, and
wherein the elevation member comprises a plurality of guide connectors disposed at positions respectively corresponding to the plurality of driving guides.

11. The sound output unit of claim 9,
wherein the driving guide comprises an inclined portion upwardly inclined along a first direction, and
wherein inclination of the inclined portion forms an acute angle, as viewed from a side.

12. The sound output device of claim 9, wherein the driving guide comprises:
an inclined portion upwardly inclined along a first direction; and
a horizontal portion connected to one end of the inclined portion and horizontally extending.

13. The sound output device of claim 9, wherein the driving guide comprises:
an inclined portion upwardly inclined along a first direction;
a first horizontal portion connected to one end of the inclined portion and horizontally extending; and
a second horizontal portion connected to the other end of the inclined portion and horizontally extending.

14. The sound output device of claim 9, wherein the driving guide comprises:
a horizontal portion horizontally extending along a first direction;
a first inclined portion connected to an end of a side of the horizontal portion in a second direction and downwardly inclined along the second direction; and
a second inclined portion connected to an end of a side of the horizontal portion in a first direction and upwardly inclined along the first direction.

15. The sound output device of claim 9, wherein the driving guide comprises:
a first horizontal portion horizontally extending along a first direction;
a first inclined portion connected to an end of a side of the first horizontal portion in the first direction and upwardly inclined along the first direction;
a second horizontal portion connected to an end of a side of the first inclined portion in the first direction and horizontally extending along the first direction;
a second inclined portion connected to an end of a side of the second horizontal portion in the first direction and upwardly inclined along the first direction; and
a third horizontal portion connected to an end of a side of the second inclined portion in the first direction and horizontally extending along the first direction.

16. The sound output device of claim 1,
wherein the support member comprises a transmission member guide guiding rotation of the transmission member in a circumferential direction, and
wherein the transmission member guide comprises:
a lower guide extending along a lower end of the transmission member; and
an upper guide extending along an upper end of the transmission member.

17. The sound output device of claim 1,
wherein the elevation member comprises a frame supporting the magnetic force generating part, and
wherein one of the support member and the frame comprises an elevation member guide extending in an upward-downward direction, and the other thereof comprises a guide receiving part into which the elevation member guide is inserted to guide movement of the elevation member in the upward-downward direction.

18. The sound output device of claim 1,
wherein the transmission member comprises a gear part forming gear teeth along a circumferential direction, and
wherein the sound output device further comprises:
- a motor generating a rotational force for rotating the transmission member; and
- a driving transmission part rotating by receiving the rotational force of the motor, and forming gear teeth to be engaged with gear teeth of the gear part.

19. The sound output device of claim 18, wherein the driving transmission part is disposed close to a centrifugal direction of the transmission member.

20. A sound output device comprising:
- a flying body having a speaker and a magnetic body;
- a magnetic force generating part generating a magnetic force in relation with the magnetic body;
- a frame to which the magnetic force generating part is fixed;
- a guide connector projected from the frame;
- a transmission member having a driving guide into which the guide connector is inserted; and
- a driving part rotating the transmission member in a circumferential direction.

21. The sound output device of claim 20, wherein the driving guide comprises:
- an inclined portion upwardly inclined along a first direction; and
- a horizontal portion connected to one end of the inclined portion and horizontally extending.

22. The sound output device of claim 20, wherein the driving guide comprises:
- an inclined portion upwardly inclined along a first direction;
- a first horizontal portion connected to one end of the inclined portion and horizontally extending; and
- a second horizontal portion connected to the other end of the inclined portion and horizontally extending.

* * * * *